April 22, 1952 C. E. MARGALA 2,593,776
DUMP BODY TILTING MECHANISM
Filed March 21, 1950 2 SHEETS—SHEET 1

INVENTOR.
Charles E. Margala.
BY
*W. B. Harpman*
ATTORNEY.

April 22, 1952  C. E. MARGALA  2,593,776
DUMP BODY TILTING MECHANISM
Filed March 21, 1950  2 SHEETS—SHEET 2
FIG. 2.
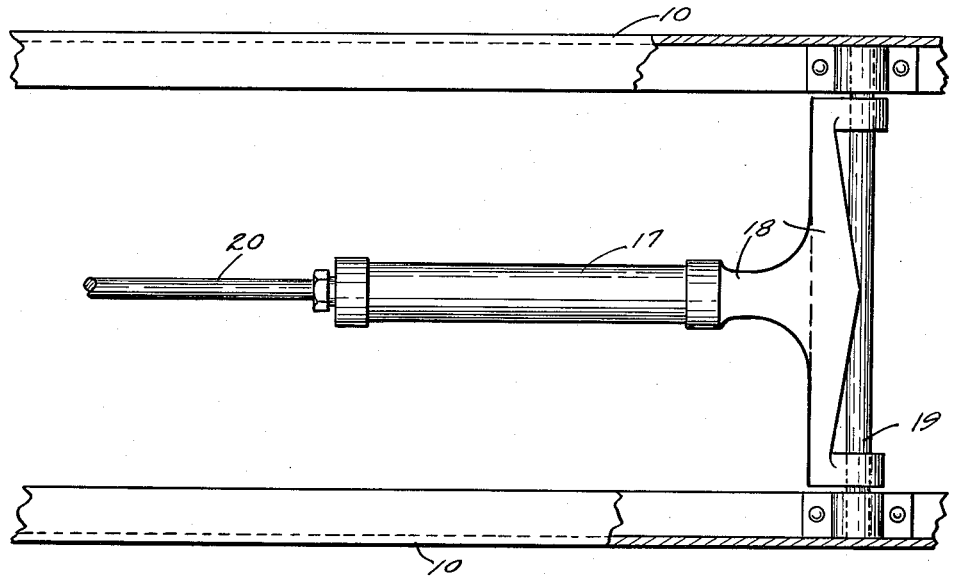
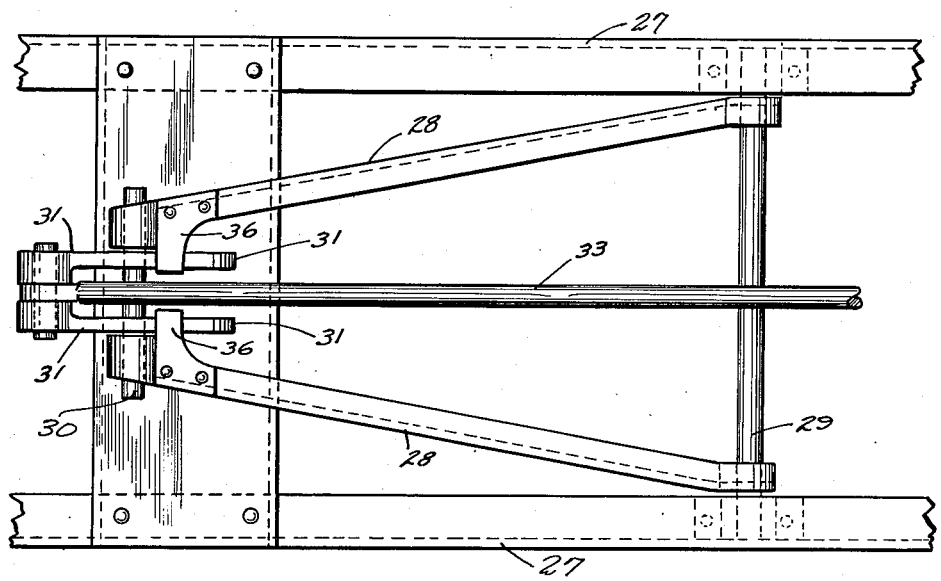
FIG. 3.
INVENTOR.
Charles E. Margala.
BY
W. B. Harpman
ATTORNEY.

Patented Apr. 22, 1952

2,593,776

UNITED STATES PATENT OFFICE 2,593,776

DUMP BODY TILTING MECHANISM

Charles E. Margala, Youngstown, Ohio

Application March 21, 1950, Serial No. 150,971

2 Claims. (Cl. 298—19)

This invention relates to a lifting mechanism and more particularly to a lifting mechanism for tilting a dump body of a truck and the like.

The principal object of the invention is the provision of a lifting mechanism for elevating a dump body of a truck.

A further object of the invention is the provision of a lifting mechanism for tilting a pivoted dump body of a truck and in which mechanism the motive power unit is pivoted near the pivot point of the dump body.

A still further object of the invention is the provision of a lifting mechanism for a dump truck body utilizing a lever and a power unit for pulling the lever toward the pivot point of the dump body so as to lift the same.

A still further object of the invention is the provision of a lifting mechanism for a dump truck body that may be applied to various truck chassis and dump body constructions and operate efficiently for elevating the dump body with respect to the truck chassis.

The lifting mechanism disclosed herein comprises a combination of a power element such as a hydraulic piston and cylinder assembly and a lever, the lever being fulcrumed on the truck chassis on which the dump body is carried and the power unit being secured to or near the pivot point on which the dump body pivots. The principal novelty in the disclosure is in the provision of hydraulic actuated lifting apparatus in which a lever is actuated by the hydraulic apparatus and is pulled into vertical or near vertical position to impart lifting motion to the dump body.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 2 is a horizontal section taken on line 2—2 of Figure 1.

Figure 3 is a horizontal section taken on line 3—3 of Figure 4.

Figure 4 is a side elevation of a modified form of truck chassis and dump body thereon with parts broken away and parts in cross section.

Figure 1:
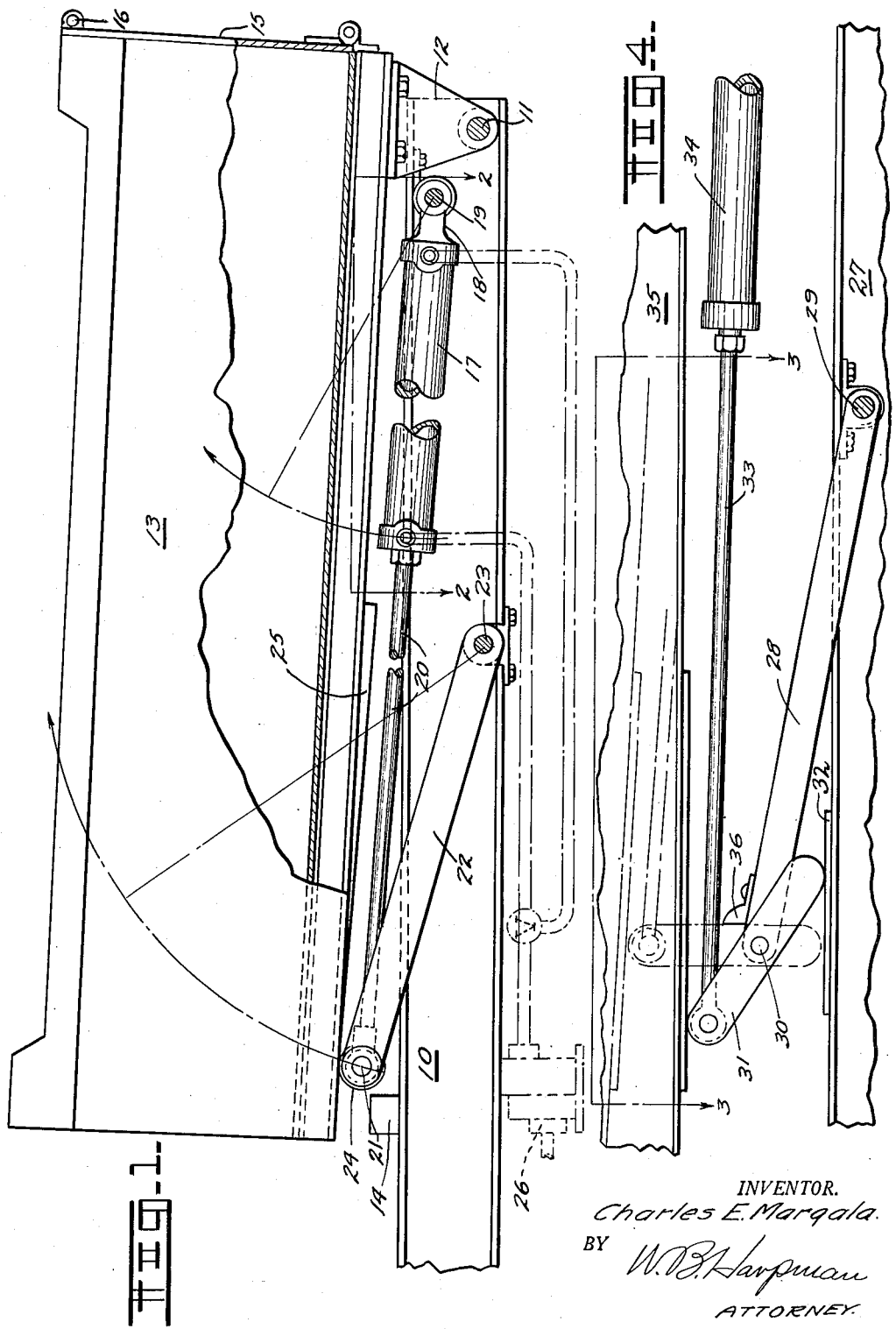
Figure 1 is a side elevation of a portion of a truck chassis and dump body thereon with parts broken away and parts in cross section.

By referring to the drawings and Figure 1 in particular it will be seen that a portion of a truck chassis 10 is disclosed carrying a transverse pivot 11 at its rearmost end portion to which a bracket 12 is pivoted, the bracket 12 forming a support for one end of a dump truck body 13. Means 14 form additional supporting means beneath the truck body 13 and adjacent its opposite end. A gate 15 is pivoted as at 16 to the dump body 13 so that when the same is moved to a tilted position based on the pivot 11, the contents of the body 13 may flow outwardly through the open gate 15.

Means for elevating the body is disclosed and comprises a hydraulic piston and cylinder assembly 17 pivoted at one end by means of a mounting bracket 18 to a transverse pivot 19 located immediately beneath the dump body 13. A piston rod 20 extends outwardly of the piston and cylinder assembly 17 and is pivotally connected as at 21 to one end of a frame 22, the other end of which is pivoted to the chassis 10 as by a pivot 23, the pivot 23 being located below the chassis 10 in offset relation to the horizontal plane thereof.

The frame 22 comprises a lever having its fulcrum based on the pivot 23 and provided on its uppermost end with a roller 24 for engaging an angular track 25 formed on the bottom of the body 13. The track 25 is preferably formed at an angle from horizontal so that it increases the lifting effect of the frame 22 when the same is moved to vertical position by the piston and cylinder assembly 17. The hydraulic piston and cylinder assembly 17 is energized by a hydraulic pump 26 which forms no part of this invention as it is well known in the art. It will be noted that it is placed in communication with both ends of the assembly 17 so that the piston rod 20 thereof may be moved in both directions, thus elevating or lowering the dump body 13, as desired.

By referring to Figure 2 of the drawings it will be seen that the pivoted end of the hydraulic piston and cylinder assembly 17 is secured to the chassis 10 near the transverse pivot 11 on which the dump body 13 pivots.

By referring to Figure 3 of the drawings it will be seen that the frame 22 is of a modified A shape with the piston rod 20 pivotally secured thereto at the apex of the said A shape.

In Figure 4 of the drawings an alternate construction of the lifting frame 22 is shown and it will be seen that a chassis frame is indicated by the numeral 27, the modified A frame by the numeral 28, the same being pivoted at a point below the chasis 27 as by a pivot 29 and the free end of the frame 28 provided with a transverse pivot 30 to which a lever 31 is pivoted midway between its ends. The chassis 27 is provided with a track 32 beneath the one end of the lever 31 and the other end of the lever 31 is pivoted to a piston rod 33 of a hydraulic piston and cylinder assembly 34. A dump body 35 is mounted above the piston and cylinder assembly 34 and is adapted to be initially elevated by movement of the lever 31 which moves from approximately longitudinal or parallel alignment with the frame 28 to substantially a right angle with respect thereto, the initial action lifting the dump body 35 and, in effect, further spacing the pivot 29 which forms the fulcrum of the frame 28 with respect to the truck body prior to the movement of the frame 28 by the piston and cylinder assembly 34.

A structural member 36 formed on the frame 28 acts as a limiting means with respect to movement of the lever 31 so that when it has moved to the position shown in dotted lines in Figure 4, the subsequent action will be that of lifting the frame 28 in the same manner as the lifting action heretofore described in connection with the frame 22 in Figure 1 of the drawings.

It will thus be seen that a simple and efficient lifting mechanism for truck and dump body combinations has been disclosed which utilizes a motive power unit and a lever so arranged that the lever is pulled from substantially horizontal position to substantially vertical position and the movement applied directly to the dump body of the combination to tilt the same for discharging the contents thereof. It will also be seen that the construction is capable of simple and economic manufacture, that it may be applied to various truck chassis and dump body constructions with little or no alteration of the same and that it therefore meets the several objects of the invention.

Having thus described my invention, what I claim is:

1. The combination of a truck frame and a body pivotally mounted thereon adjacent one end of said truck body for tipping movement with respect to said frame, means for elevating said body, said means including a two-part A frame, the base of which is pivoted to said frame at a point thereon midway between the ends of the said body and a hydraulic piston and cylinder assembly, one end of which is pivoted to the said frame at a point adjacent the pivotal mounting of the said body on said frame and elevated with respect to the said pivotal mounting of the said A frame to the base, the piston rod of the said piston and cylinder assembly being pivotally secured to the outermost end of said two-part A frame and pump means for energizing the said hydraulic piston and cylinder assembly whereby the body may be lifted by movement of said two-part A frame toward said hydraulic piston and cylinder assembly.

2. The lifting means set forth in claim 1 wherein the A frame is formed as a composite member, one portion of which is pivoted at a point midway between its ends to the other, the said piston and cylinder assembly being pivotally connected to the outward end of the pivoted portion of the said A frame whereby initial movement imparted to the composite A frame moves the said pivoted member thereof and subsequently both members of the composite A frame.

CHARLES E. MARGALA.

REFERENCES CITED

The following references are of record in the file of this patent:

UNITED STATES PATENTS

| Number | Name | Date |
| --- | --- | --- |
| 1,533,436 | Lowry | Apr. 14, 1925 |
| 1,693,874 | Sirot | Dec. 4, 1928 |
| 1,889,520 | Anthony | Nov. 29, 1932 |
| 2,172,138 | Harley | Sept. 5, 1939 |
| 2,488,790 | Wood | Nov. 22, 1949 |
| 2,497,844 | Biszuntz | Feb. 21, 1950 |
| 2,507,169 | Lundell | May 9, 1950 |

FOREIGN PATENTS

| Number | Country | Date |
| --- | --- | --- |
| 578,797 | Great Britain | July 11, 1946 |